(12) United States Patent
Lorenzo et al.

(10) Patent No.: US 6,439,649 B1
(45) Date of Patent: Aug. 27, 2002

(54) PICKUP TRUCK BOX

(75) Inventors: Luis Lorenzo, Midland; Vikas Gupta, Farmington Hills; David L. Chapman; David M. Courter, both of Lake Orion, all of MI (US)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 09/785,767

(22) Filed: Feb. 15, 2001

(51) Int. Cl.[7] .............................................. B62D 33/00
(52) U.S. Cl. ...................................... 296/183; 296/901
(58) Field of Search ................................ 296/183, 901, 296/39.2

(56) References Cited

U.S. PATENT DOCUMENTS

| | | | |
|---|---|---|---|
| 4,047,749 A | | 9/1977 | Lambitz et al. ............ 296/39 R |
| 4,353,857 A | * | 10/1982 | Ray et al. |
| 4,382,626 A | * | 5/1983 | Spooner |
| 4,693,507 A | | 9/1987 | Dressen et al. ............ 296/39 R |
| 4,705,716 A | * | 11/1987 | Tank |
| 4,921,266 A | | 5/1990 | Beals ........................ 280/415.1 |
| 4,944,612 A | | 7/1990 | Abstetar et al. ............ 296/39.2 |
| 5,263,761 A | | 11/1993 | Hathaway et al. ........... 296/100 |
| 5,660,427 A | * | 8/1997 | Freeman et al. ......... 296/183 X |
| 5,735,565 A | * | 4/1998 | Papai et al. ................. 296/39.2 |
| 5,806,909 A | | 9/1998 | Wise ......................... 296/39.1 |
| 5,927,788 A | | 7/1999 | Long .......................... 296/39.2 |
| 6,076,693 A | * | 6/2000 | Reiter et al. ............ 296/39.2 X |
| 6,142,549 A | * | 11/2000 | Clare et al. ................. 296/37.6 |
| 6,206,458 B1 | * | 3/2001 | Schroeder et al. ....... 296/183 X |
| 6,217,102 B1 | * | 4/2001 | Lathers .................. 296/100.07 |
| 6,280,551 B1 | * | 8/2001 | Hilligoss |

FOREIGN PATENT DOCUMENTS

WO    WO97/494542    12/1997

* cited by examiner

*Primary Examiner*—Joseph D. Pape

(57) ABSTRACT

A plastic pickup truck box fabricated from a plurality of separately molded sections, wherein each section is molded of a plastic material, and the molded sections are joined together with an adhesive, has advantages over conventional metal pickup truck boxes and plastic pickup truck boxes molded as a single piece. Advantages over metal pickup truck boxes include lighter weight, improved corrosion resistance, and improved impact resistance. Advantages over conventional one-piece plastic pickup truck boxes include lower production costs, lower shipping costs, and improved mechanical properties and durability.

21 Claims, 2 Drawing Sheets

PICKUP TRUCK BOX

FIELD OF THE INVENTION

This invention relates to motor vehicle body structure, and more particularly to a pickup truck box construction.

BACKGROUND OF THE INVENTION

Pickup truck boxes have traditional been made of stamped and/or roll-formed steel components that are welded together and integrated into the pickup truck body. Steel pickup truck boxes are provided with an aesthetic/protective finish coating or paint that prevents the steel from coming in direct contact with moisture and other corrosive agents. However, without supplemental protection, the finished coating on the pickup truck box can become scratched, chipped or otherwise damaged during loading and unloading of cargo and due to shifting of cargo in the pickup truck box. Scratches, chips, and other discontinuities in the finish coating expose the steel to moisture and other corrosive agents, ultimately leading to corrosion of the pickup truck box. Also, a pickup truck box that is not provided with supplemental protection can be dented during loading, unloading or shifting of cargo.

The use of a plastic pickup truck box liner to protect the pickup truck box and the finish coating on the box against damage have become very popular. However, a problem with preformed plastic liners is that they tend to trap moisture between the liner and the pickup truck box. This eventually promotes corrosion of the pickup truck box, especially along seams where the steel components of the box are joined together. Consequently, the preformed plastic pickup truck box liners can add to the cost of the vehicle without fully protecting the pickup truck box against corrosion.

An alternative to preformed pickup truck box liners is a sprayed on plastic liner that is applied in fluid form to the surfaces of the pickup truck box and cured to form a solid liner that is bonded directly to the surface of the box, whereby gaps between the liner and the box are eliminated so that moisture cannot be trapped between the liner and the box. Therefore, the sprayed on plastic liners provide enhanced corrosion protection as compared with preformed plastic liners. However, known sprayed on liners are susceptible to degradation due to exposure to ultraviolet radiation and, as a result, can exhibit deterioration of desired aesthetic and functional characteristics.

More recently, motor vehicle manufacturers have offered pickup trucks with a one-piece pickup truck box made of a glass fiber reinforced plastic. The reinforced plastic pickup truck boxes have many advantages over the traditional steel boxes, including reduced weight which in turn provides improved fuel economy, and an inherent resistance to impact and corrosion which eliminates the need for a protective liner.

The known reinforced plastic pickup truck boxes are made by a relatively expensive and complicated process in which a glass fiber preform having the desired complex three-dimensional shape of the pickup truck box is first prepared by a directed fiber preforming process in which a flow of chopped fibers is drawn by vacuum against a foraminous screen having a shape corresponding to that of the preform. The preform is then removed from the foraminous screen and laid on a mold having a shape corresponding to the preform. The mold is then closed and a plastic resin is injected under pressure into the closed mold. The resin flows through the fiber preform and around the individual glass fibers to completely fill the mold and surround the fibers. Thereafter, the resin is cured or solidified to form a unitary glass fiber reinforced pickup truck box.

In addition to being complicated and expensive, the known process can lead to the production of pickup truck boxes in which the glass reinforcing fibers are not uniformly distributed throughout the plastic. Due to the relatively deep draw depth of a pickup truck box, the glass fibers of the preform can be pulled or dragged along interior surfaces of the mold when the mold is closed. Fibers can also be carried by the resin during the resin injection step. Movement of the glass fibers either during closing of the mold or during injection of the resin can lead to a non-uniform distribution of the fiber reinforcement in the resin matrix, whereby the finished pickup truck box may have resin rich regions and resin lean regions. The resin rich regions have a reduced reinforcing fiber content and, consequently, have inferior mechanical properties. These inferior mechanical properties can lead to potential structural failures if used and/or high rates of product rejection.

Another problem associated with the known fiber reinforced plastic pickup truck boxes is that because the walls of the pickup truck box are perpendicular, or at least very nearly perpendicular, to the floor of the box, the finished unitary boxes cannot be stacked in a space efficient nested arrangement. Therefore, costs associated with shipping the known fiber reinforced plastic pickup truck boxes from the manufacturer to the location where the pickup truck is assembled can be relatively high.

SUMMARY OF THE INVENTION

In the process and product of the present invention, a pickup truck box is made of a plurality of separately molded sections made of plastic and joined together with an adhesive. The plastic pickup truck boxes of this invention have the advantages of being lightweight, and inherently resistant to corrosion and impact damage, while also facilitating lower cost production techniques and reduced shipping costs due to better nesting and packing efficiency. The pickup truck box of this invention also exhibits improved mechanical properties and durability as compared with a conventional one-piece plastic liner due to more uniform distribution of fiber reinforcement.

These and other features, advantages and objects of the present invention will be further understood and appreciated by those skilled in the art by reference to the following specification, claims and appended drawings.

DETAILED DESCRIPTION OF PREFERRED EMBODIMENTS

Figure 1:
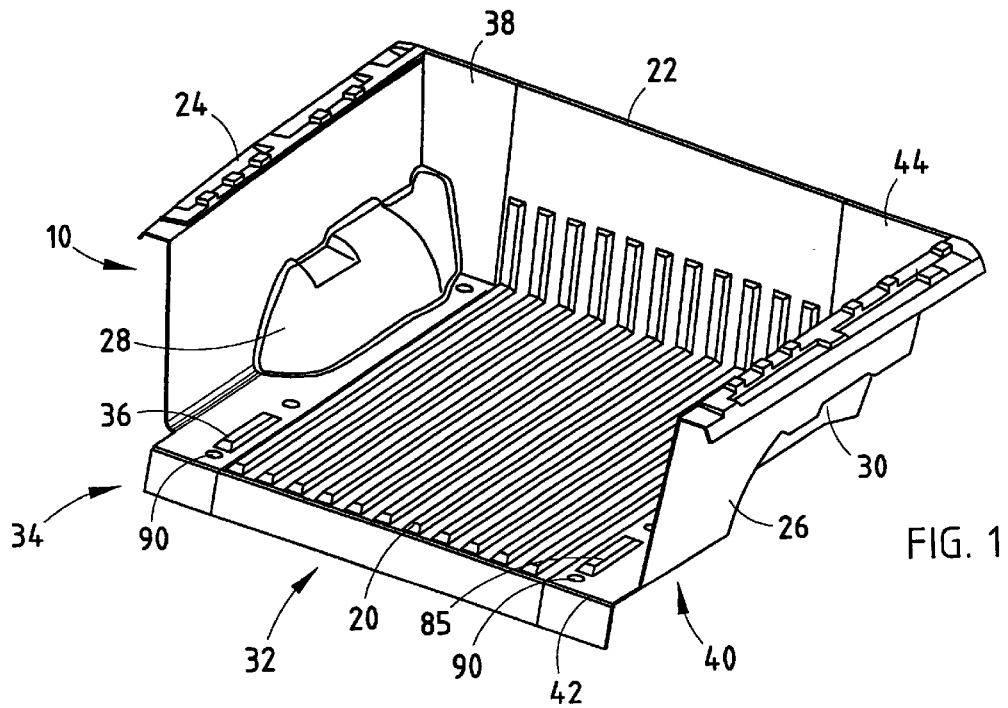
FIG. 1 is a perspective view of a pickup truck box embodying the present invention.

In FIG. 1 there is shown a pickup truck box 10 having a floor 20, a front wall 22, a left or driver's sidewall 24, and a right or passenger's sidewall 26. Pickup truck box 10 is also formed with wheel wells 28 and 30, as is conventionally known in the art.

Figure 2:
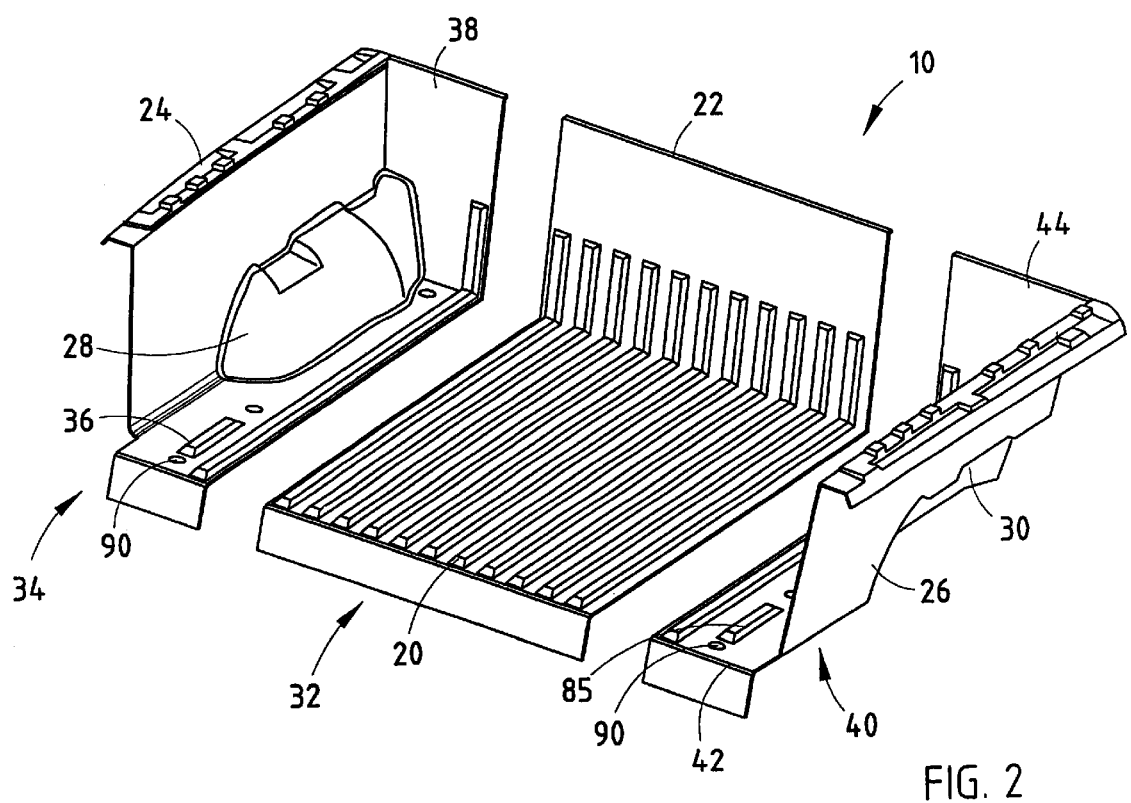
FIG. 2 is a perspective view showing the three pieces of the pickup truck box of FIG. 1 prior to being joined with an adhesive.

As shown in FIG. 2, pickup truck box 10 is comprised of three separately molded pieces or sections, including a central section 32 which defines most of the area of floor 20 and front wall 22 (typically 60–100% of the width of floor 20 and front wall 22); a left or driver's side section 34 defining left sidewall 24, a left wheel well 28, a portion 36 of floor 20 and a portion 38 of front wall 22; and a right or passenger's side section 40 defining right sidewall 26, a right wheel well 30, portion 42 of floor 20 and portion 44 of front wall 22. Sections 32, 34 and 40 are separately molded from a plastic material, preferably from a plastic composite material.

The term "molded" as used herein refers to generally any technique by which a plastic or composite having a plastic matrix is formed into a solid component having a desired shape, and encompasses various processes for converting a fluid or flowable material into a solid. Examples of well known molding techniques that may be used for forming sections 32, 34 and 40 of pickup truck bed 10 include extrusion, sheet thermoforming, injection molding, compression molding, transfer molding, and combinations of these. The term "plastic" as used herein refers to polymers, especially synthetic polymers, that may be combined with other ingredients such as fillers, colorants, reinforcing agents, plasticizers, antioxidants, etc. and which can be shaped or molded into solid components. Plastics that can be used in forming pickup truck bed 10 include those containing thermoplastic polymers, those containing thermoset polymers, and those containing a combination of both thermoplastic polymers and thermoset polymers. The term "composite" as used herein refers to a mechanical combination of two or more materials that are solid in the finished state, are mutually insoluble, and differ in chemical nature. More particularly, the composites that are useful in this invention are reinforced plastics, especially fiber reinforced plastics.

An advantage of this invention is that sections 32, 34 and 40 may be made of different plastic materials, and may be formed using different molding techniques. For example, section 32, which will typically bear most of any load exerted by cargo hauled in box 10 can be made of a plastic material having a higher strength and better load bearing properties than the material used to form side sections 34 and 40. Also, because the load bearing requirements for sections 34 and 40 are less than the load bearing requirements of section 32, sections 34 and 40 can be made, for example, by an injection molding process, whereas panel 32 can be made by a compression molding process from sheet molding compounds or by structural reaction injection molding (SRIM), i.e., processes that ensure better material homogeneity. Thus, the invention allows greater flexibility in the selection of materials and processes, enabling fabrication of a pickup truck box having different mechanical and/or chemical properties in the different sections of the box. This allows fabrication of a plastic pickup truck box having high strength properties in selected regions where needed, while allowing lower cost materials and/or processes to be used in other regions of the box.

Another advantage of the ability to fabricate sections 32, 34 and 40 from different plastic materials, is that sections 34 and 40 can be molded, such as by injection molding, with various functional features, such as with integral storage bins, anchor means, etc. Further, the individual sections 32, 34 and 40 can be stacked in a nested arrangement having excellent packing efficiency. This can reduce shipping costs from the point at which the box sections are molded to the point at which the truck box is assembled and mounted on a pickup truck.

Although sections 32, 34 and 40 may be formed from a variety of different types of plastic materials, side sections 34 and 40 are preferably fabricated from nonreinforced or, more preferably, fiber filler or particulate reinforced polypropylene, polybutylene terephthalate, polyester, vinyl ester, polyurethane, polycarbonate/ acrylonitrile-butadiene-styrene, or polycarbonate/polyester resins. Preferred glass fiber reinforced polyurethane SRIM plastics have a flex modulus at 70° F. of from about 8,000 MPa to about 12,000 MPa, a flex strength at 70° F. of from about 196 MPa to about 250 MPa, a tensile strength at 70° F. of from about 100 to about 300 MPa (e.g., 200 MPa), an impact strength (notched Izod at 70° F.) of about 19.2 foot-pound/inch (1,018 J/M), a specific gravity of from about 1.4 to about 1.6, and a glass fiber content of from about 42% to about 48% by weight. Preferred long glass fiber reinforced polypropylene plastics have a fiber content of from about 30% to about 50% by weight, a specific gravity of from about 1.0 to about 1.3, an impact strength (notched Izod at 23° C.) of from about 50 to about 85 kJ/m$^2$, a flex modulus of from about 6,300 to about 7,200 MPa, a tensile strength at break of from about 100 to about 130 MPa, and an ash content of from about 30% to about 40%. Preferred materials for fabricating the central section 32 include polyurethane SRIM compositions and vinyl ester sheet molding compound (SMC). Desirably, conductive fillers and antioxidants are added in effective amounts. Other additives may be included in effective amounts as desired when appropriate.

Examples of particular materials useful for fabricating side sections 34 and 40 include glass fiber reinforced epoxy terminated vinyl ester resins such as DERAKANE® vinyl ester resin (available from Dow Chemical Company), glass fiber reinforced polycarbonate/acrylonitrile-butadiene-styrene blends, and glass fiber reinforced polycarbonate/polyester engineered thermoplastics sold by GE plastics as GE Xenoy® synthetic resins.

The plastics used for fabricating sections 32, 34 and 40 will typically contain a reinforcing fiber, typically glass fibers. However, other reinforcing fibers, such as carbon fibers, polyolefin fibers, polyester fibers (e.g., PET), aromatic polyamide fibers (e.g., KEVLAR® fibers), etc., may be used. Also, instead of reinforcing fibers, or in combination with reinforcing fibers, other reinforcing fillers, such as ceramic, metallic, mica, etc., may be used.

In addition to reinforcing fibers, and/or reinforcing fillers, the plastics used to make the sections (e.g., 32, 34 and 40) of the pickup truck box may include effective amounts of other additives such as ultraviolet light stabilizers and flame-retardants.

Sections 32, 34 and 40 are joined together with a structural adhesive. The adhesive used to join the sections of box 10 together are selected so that adhesive failure at the interface between the individually molded sections of the box and the adhesive will not occur. It is also preferred that the adhesive have sufficient mechanical properties so that cohesive failure of the adhesive does not occur. In other words, the preferred failure mode is in the pickup truck sections (e.g., 32, 34 and 40), not cohesive failure in the adhesive or adhesive failure at the interface between the adhesive and the sections of the pickup truck box.

Selection of an adhesive or combination of adhesives for bonding the sections of the truck box together is dependent on a variety of factors. Adhesives should be selected to ensure a uniform bond line that resists weathering and is durable enough to withstand shear and tensile forces associated with normal movement of a typical pickup truck box.

Examples of suitable adhesives include Betaseal® 1870 adhesive available from Essex Specialty Products Inc., Auburn Hills, Mich. (with or without a primer), and Betamate® 73100/730XX also available from Essex Specialty Products. Betaseal® 1870 adhesive is a one component, fast curing, high viscosity, high modulus polyurethane adhesive that can provide a high body stiffness in SRIM polyurethane substrate to SRIM polyurethane substrate adhesive applications. Betaseal® 1870 adhesive is resistant to extended outdoor weathering conditions without losing its adhesion and physical characteristics. Betaseal® 1870 adhesive may be used in combination with Essex® U-413 (U435-32) Urethane Adhesive Pinchweld Primer, which is a solvent wash for the substrate surface. Betamate® 73100/730XX (e.g., 73100/ 73002, 73005, 73010 and 73015) adhesives are structural polyurethane adhesives designed for bonding pre-painted metal to eliminate the need for mechanical fasteners. However, these adhesives are useful for bonding various thermoplastic materials and forming cross-linked polymers that are stronger than many of the bonded substrates. Lap shear testing of a SRIM polyurethane substrate bonded to another SRIM polyurethane substrate with Betaseal® 1870 adhesive showed that the average break strength was 828.6 psi, with the mode of failure being cohesive (not adhesive) failure of the cured adhesive. Lap shear testing of a SRIM polyurethane substrate to an epoxy resin coated metal substrate using Betaseal® 1870 showed an average break strength of 919.2 psi, with the failure mode being cohesive (not adhesive) failure of the cured adhesive.

In general, it is desirable that the cured adhesive have a Young's modulus of from about 5,000 to about 15,000 psi, a tensile strength of from about 500 to about 3,000 psi, a shear strength of from about 500 to about 2,000 psi, a Poissons ratio of from about 0.45 to about 0.50, a shear modulus of from about 95 to about 600 MPa, and an elongation at failure of from about 50% to about 300%.

The plurality of sections forming the pickup truck box of this invention can be joined together with adhesive beads (e.g., adhesive beads 54, 55 and 56 of FIG. 3 or 60 of FIG. 4) that are deposited between overlapping edges of these sections. The size of the adhesive bead is dependent upon the adhesive being used, the configuration of the joint, and the material used for fabricating the sections of the pickup truck box. Typically, the adhesive beads will be from about 1 millimeter to about 20 millimeters wide and from about 10 millimeters to about 40 millimeters high, and extends along the entire length of the seam.

Temporary mechanical fasteners may be used to hold sections of the pickup truck box together until the adhesive bead or beads joining the sections together have cured. Also, snap-fit fasteners 85 integrally molded into the sections of the pickup truck box can be used to temporarily or permanently hold the sections of the pickup truck box together to compensate for any warping or inconsistency in the spatial relation of the sections being bonded together. Such snap-fit fasteners may also ensure that there is a distinct uniform fit associated with each pickup truck box, and may reduce or eliminate human error associated with assembly of the pickup truck box.

Permanent fasteners 90 such as metal screws or rivets, or plastic pins, cones, wedges or tabs, may be used to supplement the adhesive bond and/or hold the sections of the pickup truck box together until the adhesive bead or adhesive beads have cured.

Figure 3:
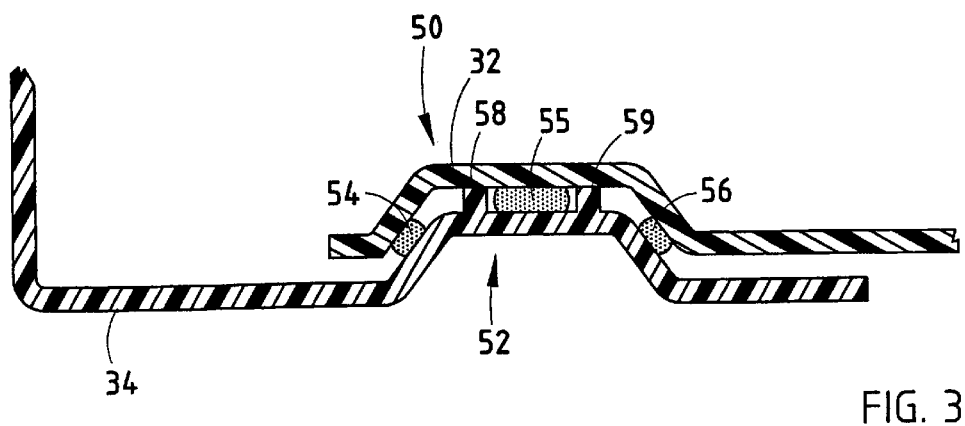
FIGS. 3, 4 and 5 are cross-sectional views showing various joint arrangements for bonding the sections of the pickup truck box together.
Figure 4:
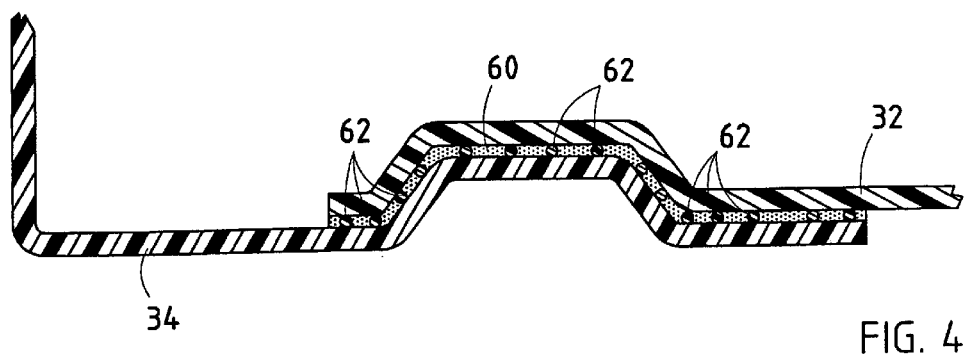

The sections of the box (e.g., 32, 34 and 40) are preferably joined together at overlapping portions of the molded sections, as adhesive butt joints generally will not provide sufficient strength when the box is subjected to high flexural loads. The joints are preferably designed to provide at least two different adhesively bonded non-parallel interfaces, and to prevent moisture from becoming trapped at the joints. Preferably, the overlapping portions comprise nesting inverted channels or corrugations (FIGS. 3 and 4). In FIG. 3, sections 32 and 34 are provided with overlapping, nesting corrugations 50, 52, and adhesive beads 54, 55 and 56 are deposited on each of three different non-parallel planes, whereby regardless of the type of tensile or flexural load imposed on the box, at least one of the planes is under a shear load. It is desirable that a spacer be provided, either in the adhesive or on at least one of the panels (e.g., 32 and 34), to maintain a gap having a fixed dimension (e.g., about 1 mm) between the overlapping areas where the molded sections are adhesively joined together. This insures that an adequately thick layer of structural adhesive will remain between the overlapping layers when they are pressed together. For example, as shown in FIG. 3, section 34 can be molded with standoffs 58, 59 that maintain a uniform gap between sections 34 and 32.

In an alternative embodiment shown in FIG. 4, an adhesive 60 may be applied in a plurality of beads in such quantity that the gap between section 32 and 34 is completely filled when the sections are pressed together. As shown in FIG. 3, a desired gap is maintained by a plurality of spacer beads 62 uniformly dispersed in adhesive 60. Spacer beads 62 can, for example, be glass beads having a diameter corresponding to the desired gap (e.g., about 1 mm).

Figure 5:
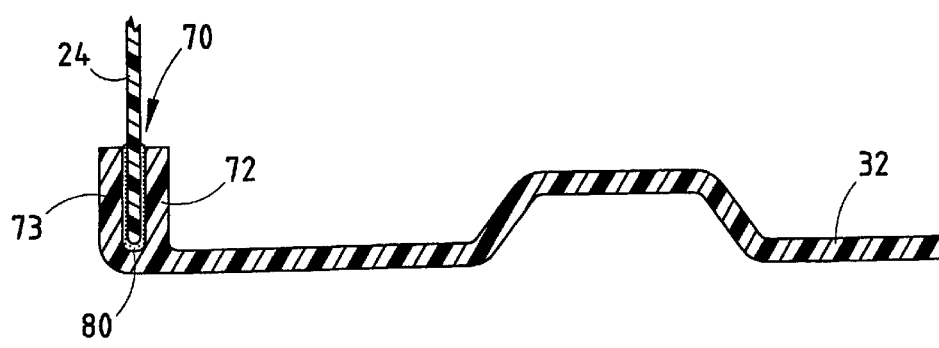

In an alternative preferred embodiment, a tongue in groove joint is utilized (FIG. 5), wherein a groove 70 is molded into section 34. More specifically, section 34 includes at its lower edges a groove 70 defined by spaced apart upright walls 72 and 73 into which is inserted an upwardly protruding tongue 76 of section 32, with an adhesive 80 disposed in regions between tongue 76 and walls 72 and 73. The spacing between walls 72 and 73 is sufficient to accommodate edge 76, and leave sufficient space between edge 76 and walls 72 and 73 to accommodate a layer of adhesive which is about 1 mm thick.

Although the illustrated embodiment shows a three piece construction in which sections 32, 34 and 40 are adhesively joined, the advantages of this invention may be achieved with four, five, six, or generally any number of separately molded pieces that are adhesively joined together.

The various sections of the pickup truck box can be molded with metal inserts if desired to provide attachment points, structural reinforcement, etc. Also, the sections (e.g., 32, 34 and 40) can be molded with long glass fiber pultruded stringers, such as to provide structural reinforcement.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A frameless pickup truck box, consisting essentially of:
   a plurality of separately molded sections, each of said sections defining a portion of a wall of the pickup truck box, a portion of a floor of the pickup truck box, or both a portion of a wall and a portion of a floor of the pickup truck box, and each of said sections molded of a plastic material, said molded sections joined together with an adhesive.

2. The pickup truck box of claim 1, wherein each of said sections is molded of a plastic material comprising a resin selected from the group consisting of polypropylene, polybutylene terephthalate, polyester, vinyl ester, polyurethane, a polycarbonate/ acrylonitrile-butadiene-styrene blend, and a polycarbonate/polyester blend.

3. The pickup truck box of claim 1, wherein at least one of said sections is molded of a fiber or filler reinforced plastic.

4. The pickup truck box of claim 1, wherein at least one of said sections is molded from a fiber reinforced plastic, wherein the reinforcing fiber is selected from the group consisting of carbon fibers, polyolefin fibers, polyester fibers, and aromatic polyamide fibers.

5. The pickup truck box of claim 1, wherein at least one of said sections is molded from a filler reinforced plastic material, wherein the reinforcing filler is selected from the group consisting of ceramic fillers, metallic fillers and mica.

6. The pickup truck box of claim 1, wherein at least one of said sections is molded from a glass fiber reinforced plastic material.

7. The pickup truck box of claim 1, wherein at least one of said sections is molded of a plastic material selected from the group consisting of fiber reinforced vinyl esters and fiber reinforced polyurethanes, and at least one other section is molded of a plastic material selected from the group consisting of a fiber reinforced polypropylene, a fiber reinforced polybutylene terephthalate, a fiber reinforced polyester, a fiber reinforced polycarbonate/polyester blend, and a polycarbonate/acrylonitrile-butadiene-styrene blend.

8. The pickup truck box of claim 1, wherein at least one of said sections is molded from a glass fiber reinforced polyurethane, and at least one other section is molded from a glass fiber reinforced polypropylene.

9. The pickup truck box of claim 1, wherein at least one of said sections is molded from a glass fiber reinforced polyurethane, and has a flex modulus at 70° F. of from about 8,000 MPa to about 12,000 MPa, a flex strength at 70° F. of from about 196 MPa to about 250 MPa, a tensile strength at 70° F. of from about 100 to about 300 MPa, a specific gravity of from about 1.4 to about 1.6, and a glass fiber content of from about 42% to about 48% by weight.

10. The pickup truck box of claim 1, wherein at least one of said sections is molded of a glass fiber reinforced polypropylene having a fiber content of from about 30% to about 50% by weight, a specific gravity of from about 1.0 to about 1.3, a notched Izod impact strength at 23° C. of from about 50 to about 85 kj/m$^2$, a flex modulus of from about 6,300 to about 7,200 MPa, and a tensile strength at break of from about 100 to about 130 MPa.

11. The pickup truck box of claim 1, consisting essentially of three separately molded sections, including a central section which defines a floor and front wall of the pickup truck box, a left side section that defines a left side wall and a left wheel well, and a right side section defining a right side wall and a right wheel well.

12. The pickup truck box of claim 11, wherein the central section is molded of a glass fiber reinforced polyurethane or a glass fiber reinforced vinyl ester resin, and the left and right side sections are molded of a glass fiber reinforced polypropylene.

13. The pickup truck box of claim 1, wherein said molded sections are joined together with a polyurethane adhesive.

14. The pickup truck box of claim 1, wherein said molded sections are joined together with an adhesive having a Young's modulus of from about 5,000 to about 15,000 psi, a tensile strength of from about 500 to about 3,000 psi, a shear strength of from about 500 to about 2,000 psi, a Poissons ratio of from about 0.45 to about 0.50, a shear modulus of from about 95 to about 600 MPa, and an elongation at failure of from about 50% to about 300%.

15. The pickup truck box of claim 1, further comprising permanent fasteners.

16. The pickup truck box of claim 1, wherein the molded sections are molded with integral snap-fit fasteners.

17. The pickup truck box of claim 1, wherein the sections have overlapping joints and are joined by an adhesive bead disposed between said overlapping joints.

18. The pickup truck box of claim 1, wherein said overlapping joints are contoured to provide at least two different adhesively bonded non-parallel interfaces.

19. The pickup truck box of claim 1, wherein the molded sections are molded with integral snap-fit fasteners.

20. The pickup truck box of claim 1, wherein the sections have overlapping joints and are joined by an adhesive bead disposed between said overlapping joints.

21. The pickup truck box of claim 1, wherein at least one of said molded sections is molded using an injection molding process.

* * * * *